April 13, 1937.  S. W. TOOLEY  2,077,286
ANTISKID DEVICE
Filed July 22, 1935

Sam W. Tooley,
INVENTOR
BY *Victor J. Evans & Co.*
ATTORNEY

Patented Apr. 13, 1937

2,077,286

UNITED STATES PATENT OFFICE 2,077,286

ANTISKID DEVICE

Sam W. Tooley, Montello, Nev.

Application July 22, 1935, Serial No. 32,634

1 Claim. (Cl. 152—14)

My invention relates to anti-skid devices for automobile wheels and more particularly to improvements in couplings for securing cross chains to automobile wheels of the dual tire type.

An object of my invention is to provide an inexpensive, strong and easily manipulating means for coupling the ends of cross chains together in pairs so that the chains of the pairs are locked upon opposite sides of the spokes of the wheels.

Another object is to provide a device of this character for attaching or detaching chains in pairs to such wheels quickly and which permits a quick adjustment of the chains to tighten or loosen them as desired.

Still another object is to provide a practical coupling for securing anti-skid chains to heavy duty wheels which are too close to the springs for the attachment of the usual anti-skid chains thereto.

To the accomplishment of the above, and subordinate objects presently appearing, a preferred form of my invention has been illustrated in the accompanying drawing described in the following and defined in the claim appended hereto.

Figure 1:
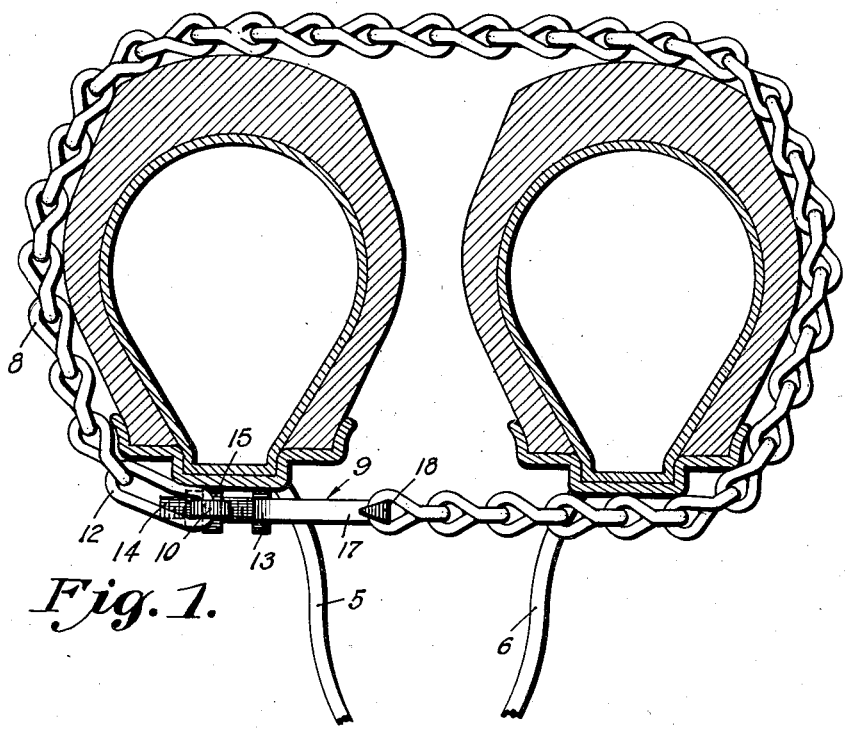
Figure 1 is a fragmentary view in cross section of a portion of a wheel of the dual type having a cross chain secured thereto by means of my improved coupling.

Reference being had to the drawing by numeral, the numerals 1 and 2 designate the usual tires of a dual type wheel, 3 and 4 the fellies, and 5 and 6 portions of opposed spokes of the wheel.

According to my invention, a pair of cross chains 7 and 8 are secured around the wheel upon opposite sides of the spokes 5 and 6 by means of a coupling designated generally 9.

Figure 2:
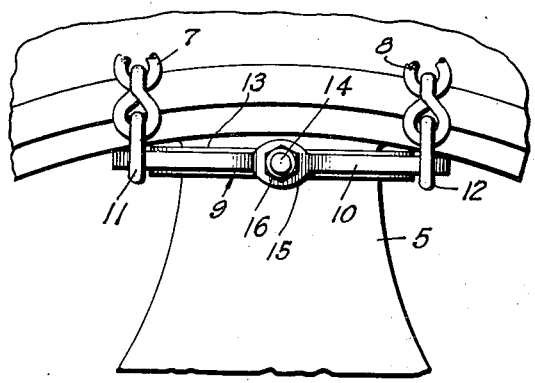
Figure 2 is a fragmentary view in side elevation.
Figure 3:
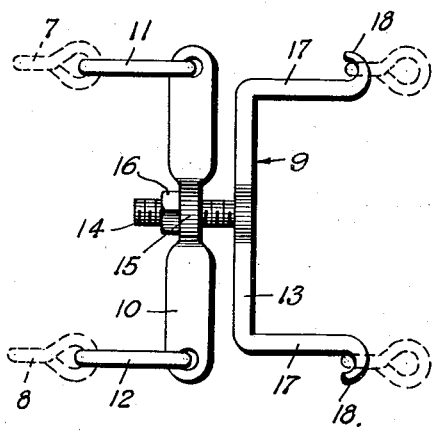
Figure 3 is a detail view in top plan of my improved coupling.

The coupling 9 comprises a coupling bar 10 to which the ends of the chains 7 and 8 are connected on the outside of the wheel by means of links 11 and 12, the bar extending across the spoke on its side of the wheel as will be clear from Figure 2. Cooperating with the coupling bar 10 is a coupling yoke 13 of right angular U-shape, said yoke having intermediate its sides a threaded stud 14 projecting therefrom and passing through a boss 15 on the bar 10 intermediate the ends of the latter. A nut 16 is threaded on the stud 14 to adjustably hold the yoke and bar in proper relation. The sides 17 of the yoke 13 are sufficiently separated to straddle the spoke of the wheel and are provided with hooked extremities 18 to which the other ends of the cross chains 7 and 8 are connected. The coupling yoke 9, it will be understood, is located on the outside of the spoke but preferably out of contact with the spoke, although it may be otherwise positioned if desired.

By positioning the yoke 9 with the ends of the chains 7 and 8 hooked thereto, astride of the spoke portion, the coupling bar 10 may be readily placed over the stud 14 and secured thereto by the nut 16 which may then be adjusted to tighten the chains to the desired extent. Conversely by removing the nut 16 the bar 10 may be removed from off the stud 14, it being understood that the bar 10 is freely mounted on the stud. Upon removal of the bar 10, as will be manifest, the chains may be readily detached.

Although the operation of detaching the chains has been described as including detaching the coupling bar and yoke from each other, the chains may be detached by merely loosening the connection of the said bar to the yoke sufficiently to unhook the chains from the latter.

A particular feature of my invention is that it provides for securing cross chains to heavy duty wheels of the type which are too close to the springs to permit of the usual type of chains. By securing the cross chains together in pairs upon opposite sides of the spokes and to said spokes in the manner described, the chains are prevented from creeping or working against the valve stem and breaking the latter off.

Obviously changes in the described detail of my invention may be made without departing from the inventive concept and right is herein reserved to all such changes falling within the scope of the protection prayed.

What I claim is:

An anti-skid device for automobile wheels of the dual type comprising, a pair of skid chains, a coupling bar to each end of which one end of one of said chains is connected, said bar having an aperture therein intermediate its ends, a U-shaped yoke member comprising substantially parallel side arms and a cross bar, the side arms being of sufficient length to straddle a spoke of the wheels and prevent creeping, said side arms terminating in outwardly opening hooks disposed in the plane of the yoke member for the connection of the ends of the chains which pass straight across the inner peripheries of both wheels, a threaded stud projecting from the center of the cross bar and extending through said aperture, and a nut on said stud adjustably and detachably securing said yoke and said bar together.

SAM W. TOOLEY.